Nov. 18, 1952   V. A. HOOVER   2,618,368
MAGNETIC CLUTCH
Filed Sept. 29, 1948
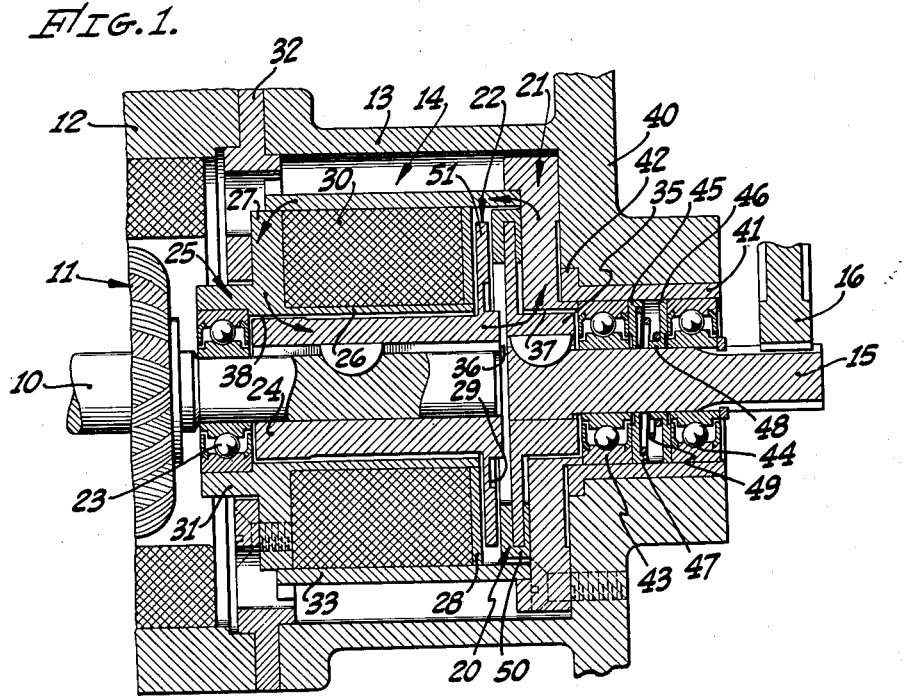
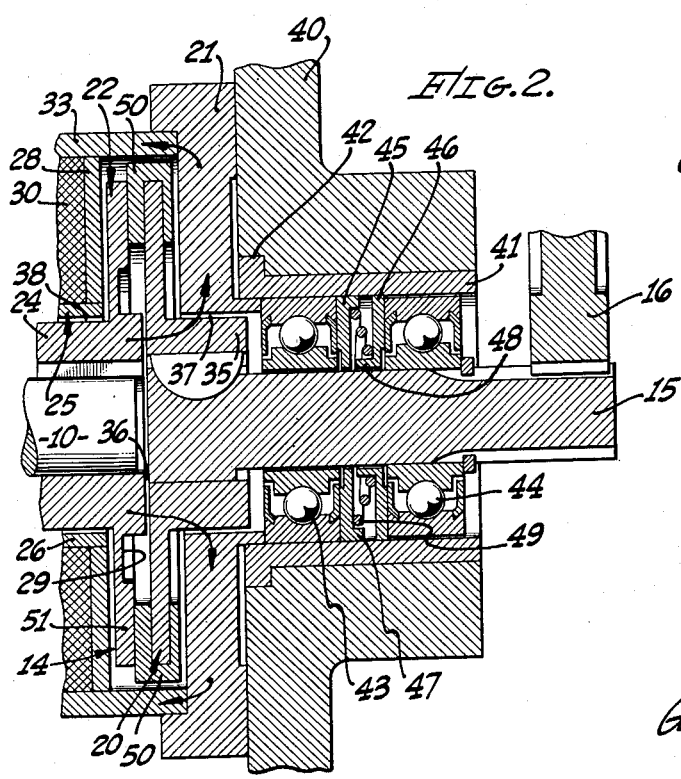
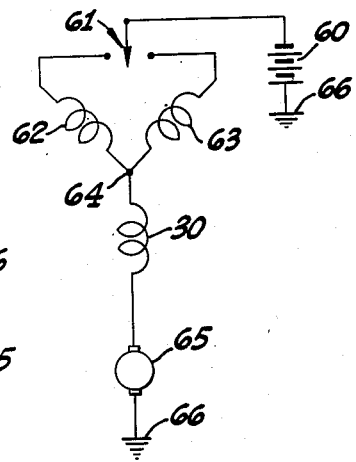
INVENTOR.
VAINO A. HOOVER
BY
Robert W. Fulwider
ATTORNEY.

Patented Nov. 18, 1952

2,618,368

UNITED STATES PATENT OFFICE 2,618,368

MAGNETIC CLUTCH

Vaino A. Hoover, Los Angeles, Calif.

Application September 29, 1948, Serial No. 51,784

4 Claims. (Cl. 192—84)

My invention relates generally to clutches adapted to connect a rotating driving member to a driven member, and more particularly to clutches of this type that are operated by electro-magnetic means.

As the use of electric motors has increased, particularly in applications such as control systems, it has become increasingly important to provide means to connect and disconnect the driving shafts of these motors with the driven members rapidly and automatically in order that precise control may be obtained. Furthermore, in the case where the driven member is to be held against movement when it is once positioned, it is very desirable to provide a braking means which releases the driven member when the clutch is engaged, and which holds or locks it when the clutch is disengaged. Magnetic clutches have been developed which meet most of these requirements, the operating coils of the clutches being connected in series with the electric motor so that energizing the motor operates the clutch in a manner to release its braking members and engage its clutch members.

However, many of these prior clutches have been objectionable from the standpoint that when the driven member is lightly or negatively loaded, as in the case of a hoist lowering an object, the current passing through the motor often reaches so low a value that it is insufficient to hold the clutch in engaged position. Under these circumstances, the clutch discs separate, leaving the motor running free at no load and the driven load stopped by the operation of the brake.

In addition, it will be appreciated that a magnetic clutch of this general type will normally have both rotating and non-rotating members included in its magnetic circuit, and it is thus important that the device be constructed with the greatest regard for precision and maintenance of close tolerances in order that the maximum efficiency of the clutch be maintained. Because of the axial movement of at least one of the clutch members, the problem of securing proper and adequate bearings for the various movable members becomes quite important. In this connection, the mechanical alignment of the various parts is of great importance, and while every precaution is taken to insure the proper alignment, some provision must be made to compensate for wear and the necessary manufacturing tolerances.

It is therefore a major object of my invention to provide an improved magnetic clutch of simple but precise construction.

Another object of my invention is to provide a clutch of this type having improved bearing means that furnish a maximum of support for the various moving parts.

It is a further object of my invention to provide a clutch whose construction is such as to permit the maximum precision in manufacturing, while at the same time compensating for inescapable inaccuracies of fabrication.

Still another object of my invention is to provide a clutch having a very efficient magnetic circuit so that the clutch remains engaged even though the current through the motor has dropped to a very low value.

It is a still further object of my invention to provide a clutch of this general type so designed that it may be installed and removed from its associated mechanism as a unit.

These and other objects and advantages of my invention will become apparent from the following description of a preferred form thereof, and from the drawings illustrating that form in which Figure 1 is an axial sectional view taken through the clutch, showing its connection to the driving and driven members;

Figure 2 is an enlarged axial sectional view of the movable members of the clutch, showing the latter in engaged position; and Figure 3 is a schematic wiring diagram indicating the method of electrically connecting the clutch.

Referring now to the drawings and particularly to Figures 1 and 2 thereof, the numeral 10 indicates generally a shaft hereinafter referred to as the driving shaft, and generally formed as a continuation of the shaft of an electric motor 11. As is customary, the motor 11 is provided with a frame 12, and to this frame I attach a housing 13 that encloses a magnetic clutch indicated generally by the numeral 14. Coaxially aligned with the driving shaft 10 is a driven shaft 15 supported by the housing 13 and axially movable with respect to the driving shaft to engage and disengage with the latter, while remaining in engagement with a driven member such as a gear 16. As hereinafter described, a driven disc 20 mounted on the inner end of the shaft 15 is normally urged against a stationary member 21 so that the friction between the two acts as a brake to prevent the rotation of the driven shaft 15. When the clutch is to be engaged, the disc 20 and the driven shaft 15 are moved axially toward the driving shaft 10, the disc thus being separated from the stationary member 21 and engaging a driving disc 22 mounted upon and driven by the driving shaft 10. When this occurs, the frictional engagement between the driven disc 20 and the driving disc 22 causes these two elements to rotate as a unit, thereby turning the driven shaft 15 and the gear 16.

In its broader features, a magnetic clutch such as that just described has been known and used with fair success for a number of years. However, as previously mentioned, such clutches have been open to a number of objections, and I have consequently developed a clutch incorporating these general features but operating in a much improved manner.

While other methods of construction may be used, I have found that one very satisfactory method is to form the driving shaft 10 as an integral extension of the shaft of the motor 11. Without any important exceptions, the shaft of such an electric motor is supported at each end by bearings such as the ball bearing 23, thereby providing a firm and rigid support within which the shaft 10 may rotate. The bearing 23 is supported by the frame 12 of the motor 11 in a manner hereinafter described, and the clutch housing 13 is held to the frame by bolts or other suitable means (not shown).

The end of the shaft 10 projects beyond the bearing 23 toward the previously mentioned driven shaft 15 and carries a sleeve 24 that is keyed or otherwise firmly affixed to the shaft. At its outer end, the sleeve 24 is provided with a radially extending section which forms the driving disc 22, and an annular groove 29 is formed on the face of the member 22 so that an annular bearing or clutch surface is formed. While the sleeve 24 and the rotating member 22 may be formed as separate members which are then joined to form a single member, it is generally preferable because of the magnetic circuit involved to form these two members from a single piece of magnetic material such as mild steel.

Surrounding the sleeve 24 and spaced a slight radial distance therefrom is a spool 25 having a cylindrical core 26 and a radially extending shoulder 27 at one end thereof to form an end member. A generally similar flange or shoulder 28 of non-magnetic material is mounted at the other end of the spool 25 to provide an annular space in which a winding 30 is placed. The spool 25 is formed of a magnetic material such as mild steel, and the end plate 27 has an axially projecting collar 31 thereon to receive and support the outer race of the bearing 23. A ring 32 or other suitable supporting member extends between the spool 25 and the motor frame 12 to hold the spool and the bearing 23 against movement with respect to the frame. As shown, the ring 32 preferably is interposed between the frame and the clutch housing 13 so as to be rigidly and securely held to both of these members.

The coil 30 is composed of a number of turns of insulated wire wound around the core 26, and it will be appreciated that if the end wall 28 is removable, the coil may be wound separately from the spool 25 and then slipped over the core, whereupon the end plate 28 may be fixed in position.

At the opposite end of the housing 13 from the ring 32 is the previously mentioned fixed member 21 that is firmly secured to the housing by any suitable means such as bolts. The member 21 is in the general form of an annular disc, and like many other members of this clutch, is composed of a suitable magnetic material such as mild steel. Extending from the fixed member 21 to the end wall 27 of the spool 25 is a sleeve 33 surrounding the coil 30 to protect the latter from mechanical damage and also to act as a portion of the magnetic circuit of the coil. In order to secure the maximum efficiency from this magnetic circuit, its reluctance should be reduced to a minimum, and consequently the cylinder 33 is firmly attached to the stationary member 21 and to the end member 27 so that there is an absolute minimum of air gaps in this portion of the magnetic circuit.

The sleeve 24 extends to the outer end of the shaft 10, and adjacent the sleeve but axially spaced therefrom is a collar 35 keyed or otherwise securely held to the driven shaft 15 and carrying the rotatable disc 20. The collar 35 is axially aligned with the stationary member 21, and is radially spaced therefrom a distance sufficient to insure the free rotation of the collar with respect to the stationary member. The collar 35 is formed also of a suitable magnetic material such as mild steel, and it will now be seen that a complete magnetic circuit has been formed for the coil 30. Starting from the sleeve 24, this circuit may be traced through an air gap 36 at the end of the sleeve between the latter and the collar 35, through the collar and a second air gap 37 to the stationary member 21, through the sleeve 33 and the end member 27, across an air gap 38, and back to the sleeve 24. It will be appreciated, of course, that the magnetic flux following this circuit is distributed substantially uniformly about the circumference of the various members in the circuit, and the arrows in Figures 1 and 2 indicate the described path. Strictly speaking, of course, since Figure 1 shows a de-energized clutch, there will be no substantial magnetic flux following the indicated path under these conditions except for the instant after the coil 30 has been energized and before the rotatable disc 20 and collar 35 have moved axially away from the fixed member 21 and into driving engagement with the driving disc 22. Furthermore, while the lines of magnetic flux are here illustrated as extending through the sleeve 24 from the bearing 23 toward the collar 35, their direction may be reversed by reversing the polarity of the connections to the coil 30.

It will be remembered that the magnetic circuit just described includes a total of three air gaps, an axially extending gap 36, and two radially extending gaps 37 and 38. Because of the rigid mounting of the shafts 10 and 15 in suitable bearings, these radial gaps may be held to very small values, thereby keeping the reluctance of the magnetic circuit to a minimum. By way of example only and not as a limitation, I have found that I am able to construct a very satisfactory magnetic clutch in which the radial gap 37 has a value of .004 inch, while the gap 38 has a value of .003 inch. With such a construction, the sleeve 24 and the collar 35 are both free to rotate with respect to their adjacent stationary members, while the reluctance of the radial gaps 37 and 38 is held to a minimum.

The major portion of magnetic flux enters the sleeve 24 adjoining the collar 27 so that sleeve 24 may be relieved to provide greater mechanical clearance at the end away from the end wall 27. The close clearance between the sleeve 24 and the end wall 27 is thus adjacent the bearing 23 where these parts are held in close axial alignment.

When the coil 30 is energized, the natural action of the magnetic forces thus created is to reduce the reluctance of the magnetic circuit to a minimum. Since the values of the air gaps 37 and 38 remain fixed, no movement of the members tending to shorten these gaps is possible. However, the axial gap 36 may be decreased by axial movement of the collar 35 and driven shaft 15, and consequently the collar is moved toward the sleeve 24. When this occurs, the driven disc 20 is moved away from the stationary member 21 into engagement with the driving disc 22, thereby connecting the driven shaft 15 to the driving shaft 10. To disconnect the driving and driven shafts 10 and 15 when the coil 30 is deenergized, some means must be provided to exert a continuous force on the driven shaft 15 urging it axially away from the driving shaft 10. To secure this axial movement of the driven shaft 15 while still retaining the requisite support from the bearings, I have developed the bearing structure now to be described.

While not invariably the case, it will generally be found that the driven member connected to the driven shaft 15 will develop a radial or side thrust on the shaft that tends to deflect it from its true axial alignment with the driving shaft 10. This can cause serious misalignment of the parts, and it is consequently very important that every precaution be taken to insure the true coaxial relationship between the driving shaft 10 and the driven shaft 15 under all conditions. One method of doing this is to provide bearings for the shaft 15 that exert the maximum restraint against rotation about an axis perpendicular to the axis of the shaft. In general, however, bearings especially designed for this purpose alone are unsuited for this use because of other reasons, and consequently I have developed the bearing and support construction illustrated in Figures 1 and 2.

Connected to the clutch housing 13 as an extension of the latter is a gear housing 40 having an aperture therein aligned with the driving and driven shafts 10 and 15. Within this opening, I mount a hardened steel sleeve 41 having an outwardly extending collar 42 formed on the clutch end thereof to seat firmly within the opening. The sleeve 41 is held against rotation with respect to the gear housing 40, and a pair of bearings, such as ball bearings 43 and 44, are mounted within the sleeve to receive the driven shaft 15. The bearing 43 is located adjacent the collar 35, as close thereto as mechanical considerations will permit. The opposite end of the driven shaft 15 is provided with gear teeth or other suitable means for engaging the driven member 16, and the bearing 44 is located as closely adjacent the driven member as is mechanically feasible. The bearings 43 and 44 are thus axially separated an appreciable distance, thereby securely holding the driven shaft against pivoting or rotating about an axis perpendicular to its own axis, while still permitting free rotation of the shaft about its axis.

In addition to the rigid support of the driven shaft 15, the bearings 43 and 44 should also be designed to provide for the axial movement of the shaft. Furthermore, as previously mentioned, some form of resilient means should be provided to urge the shaft axially away from the drive shaft 10 to insure the separation of the driven disc 20 from the driving disc 22, and its engagement with the stationary member 21. By combining both of these functions, I am able to provide a simple and efficient bearing structure.

As best seen in Figure 2, the inner bearing 43, adjacent the collar 35, is placed within the sleeve 41 so that its outer race is firmly held by the sleeve. The inner race of this bearing would normally have a tight fit with the driven shaft 15, but the latter is relieved or formed slightly undersized in the immediate vicinity of the inner race of the bearing 43. Thus, while the driven shaft 15 is supported by the bearing 43 and the inner race of the latter rotates with the shaft, the shaft is nevertheless capable of limited axial movement with respect to the inner race of the bearing. The outer bearing 44, adjacent the driven member 16, is the same stock bearing as the inner bearing 43, but the inner diameter of the sleeve 41 is slightly greater than the outer diameter of the bearing 44 so that this race may move axially with respect to the sleeve 41. The inner race of the outer bearing 44 may fit tightly on the driven shaft 15, and the bearing 44 thus provides support for the shaft while permitting the limited axial movement thereof.

It will be appreciated, of course, that instead of the construction described, the inner race of the bearing 43 may be relieved or slightly enlarged to provide the requisite clearance from the driven shaft 15, and the bearing 44 may be selected to have a minimum external diameter to provide a sliding clearance to the sleeve 41. In each case, it is the axial freedom of the driven shaft 15 and the radial support thereof which must be provided.

Adjacent the outer face of the inner bearing 43 is a cup-shaped thrust washer 45 bearing against the outer, axially immovable race of the bearing, and relieved or cut away adjacent the inner race to clear the latter and the driven shaft 15 so that the washer remains stationary. A cooperating thrust washer 46 bears against the outer race of the outer bearing 44 and is relieved or cut away adjacent the inner race of the bearing and the driven shaft 15. The washer 45 has an outwardly located, axially projecting lip 47 extending toward the bearing 44, and the washer 46 has a centrally located axially projecting lip 48 extending toward the bearing 43. A spring 49 is mounted between the washers 45 and 46 and is centrally positioned by the lips 47 and 48 to urge the washers and the bearings 43 and 44 apart. Since the bearing 43 is fixed with respect to the sleeve 41 and axially slidable with respect to the shaft 15, while the bearing 44 is fixed with respect to the shaft and slidable with respect to the sleeve, the action of the spring 49 is to urge the outer bearing 44 and the driven shaft axially toward the driven member 16 to the position indicated in Figure 1. When the coil 30 is energized, the effect of the magnetomotive force generated thereby is to attract the collar 35, thereby moving the latter with the driven shaft 15 toward the position indicated in Figure 2. In connection with the latter figure, it will be recognized that the separation indicated between the inner race of the bearing 43 and the shaft 15, and the separation of the outer race of the bearing 44 from the sleeve 41 is greatly exaggerated in order that the construction and operation of the device may be clearly understood.

Normally, the collar 35 and the driven disc 20 will be formed from a single piece of metal, and since the collar must be a magnetic material, the body of the radially extending disc will be of the same material, usually iron. For equally apparent reasons, the driving disc 22 and the stationary member 21 are also usually formed of iron, and it is generally undesirable to have cooperating clutch and brake surfaces formed of the same materials. To overcome this difficulty, I prefer to form friction surfaces around the outer edge of the rotatable disc 20 of a granular and preferably non-magnetic material such as sprayed tobin bronze. While many different methods may be used, I prefer to apply a layer of bronze to both sides of the driven disc 20 by spraying the bronze in a molten state onto the disc and then machining to dimension, so that a generally annular bearing member 50 is formed. By coating both sides of the driven disc 20, one side of the bearing member 50 will bear against the rotatable disc 22, while the other side of the bearing member will engage the stationary member 21. By this method, friction surfaces are obtained which have a high coefficient of friction, do not glaze, and have good wearing qualities.

The non-magnetic clutching material 50 is formed as an annular ring on both faces of disc 20 adjacent to the outer edge thereof. Thus, the braking or clutching contact is at the maximum radial distance from the center of the shaft 15, thereby producing the greatest possible torque. The driving face of the member 50 extends axially from disc 20 a sufficient axial distance to prevent contact of the faces of sleeves 24 and 37 in the driving function of the clutch. Thus, the driving contact is on the high frictional surface of member 50 and at maximum possible diameter. In the driving position, the axial air gap 36 is of the order of .010 inch while the thickness of the material 50 on the driving surface is several times greater. Thus, the magnetic field is concentrated in the small axial air gap between sleeves 24 and 37, thereby producing the greatest possible clutching force.

As previously mentioned, the driving gear 16 has a tendency to impose a radial load upon the driven shaft 15, and even though the bearings 43 and 44 are separated an appreciable amount, there is nevertheless a tendency for the driven shaft to be pivoted or rotated about an axis perpendicular to its own. Any such movement of the driven shaft 15 is communicated to the collar 35 and to the driven disc 20, rotating the latter to a position which is no longer perpendicular to the axis of the driving shaft 10. When this occurs, the bearing member 50 and the rotating or driving disc 22 will contact at one edge only instead of over the whole face, and as a result, the torque transmitted between these two frictionally engaged surfaces will be materially reduced. Furthermore, any departure from the parallel relationship of the driving disc 22 and the bearing member 50, caused by irregularities or manufacturing tolerances, will have the same effect, the result being the same regardless of the cause.

To overcome these difficulties, I provide the driving or rotating disc 22 with the inner annular groove 29 previously mentioned, while the outer portion of the disc is left at its full thickness to provide a bearing surface 51 adapted to yieldably engage the bearing member 50. The thinner portion, formed by the groove 29, thus provides a resilient connection between the bearing surface 51 and the sleeve 24, permitting the bearing surface to be deformed from its normal position perpendicular to the axis of the sleeve, to a position parallel to the driven disc 20. In this manner, full advantage is taken of the complete bearing surface of both the bearing member 50 and the driving disc 22. The operation of the clutch is thus improved and made more dependable, with the assurance that the maximum torque will be transmitted at all times.

It will be apparent that my improved magnetic clutch may be constructed and connected in various fashions. In Figure 3 I have illustrated one very simple circuit for controlling the operation of my clutch in synchronism with the operation of the motor 11. As indicated in that figure, one terminal of a battery 60 or other source of power is connected to a switch 61 which is normally open but is adapted to be moved to either of two contacts to energize either field winding 62 or field winding 63 of the motor 11. The two field windings are connected to a common junction point 64, to which one terminal of the coil 30 is also connected, the other terminal of that coil being connected through the motor armature 65 to the other terminal of the battery 60, thereby completing the circuit.

In this manner, when either of the field windings 62 or 63 is energized to drive the motor 11 in forward or reverse direction, the coil 30 is likewise energized. Energization of the coil 30 moves the collar 35 toward the driving shaft 10 to force the bearing member 50 into frictional contact with the driving disc 22 so that the full power of the motor 11 is delivered to the driven shaft 15. When the coil 30 is de-energized, the spring 49 immediately moves the driven shaft 15 and the rotatable disc 20 away from the driving shaft 10 so that the bearing member 50 engages and is held by the stationary member 21, thereby locking the driven shaft against rotation.

From the foregoing description, it will be seen that I have provided a magnetic clutch having improved features of construction and operation not heretofore available. For example, the spool 25 may have its core 26 properly and accurately formed, and the hole extending axially through the core thereafter used as the center or reference point for further manufacturing operations. As a result, concentricity of the core 26 and sleeve 24 is assured, the bearing 23 is properly and concentrically located, and alignment of the driving disc 22 and the driven disc 20 is reduced to its simplest aspects.

The clutch bearing 13, the flanges 32 and the motor frame 12 are bolted together at the engaging flanges. By removing the holding bolts, the flanges 32, the motor frame 12, together with the clutch coil 30, sleeve 33 and driving clutch disc 51 may be removed from the clutch housing 13, as a unit. The removal of the sleeve 33 exposes the screws holding the plate 21 to the gear housing 40. The driven clutch disc assembly, including the plate 21, bearings 43 and 44, and shaft 15, may then be removed as a unit from the sleeve 41 and the clutch housing 13.

As a result, all of the members of the clutch are accurately and securely mounted, but they may be easily and quickly removed whenever service work must be performed. Furthermore, it is not necessary that access be had to the interior of the gear housing 40, other than that provided by the clutch housing 13 and the hole surrounding the sleeve 41, in order to install or remove the clutch assembly.

Various changes and modifications may be made in my invention without departing from the broad concepts thereof as herein defined. Consequently, I do not wish to be restricted to the particular form or arrangement of parts herein described and shown, except as limited by my claims.

I claim:

1. A magnetic clutch and brake of the class described which includes: a driving shaft; a driving disk mounted on said shaft for rotation therewith; a driven shaft coaxial with said driving shaft; a driven disk mounted on said driven shaft for movement therewith; a stationary annular brake plate surrounding said driven shaft adjacent said driven disk, said driven disk being disposed between said brake plate and said driving disk; a first bearing means supporting said driven shaft and axially immovable with respect to said driving shaft; a second bearing means supporting said driven shaft and axially immovable with respect thereto, said first and second bearing means being axially separated and mechanically independent of said driving shaft; resilient means extending between said first and second bearing means for urging said driven shaft axially away from said driving shaft to cause braking engagement of said driven disk with said brake plate; and magnetic means operable to move said driven shaft axially toward said driving shaft against the urging of said resilient means to cause driving engagement of said driven disk with said driving disk.

2. A magnetic clutch and brake of the class described which includes: a driving shaft; a driving disk mounted on said shaft for rotation therewith, having an outwardly located annular bearing surface and a radially inwardly located resilient annular section transmitting rotational power from said shaft to said bearing surface, but flexing so that said bearing surface may be displaced from a plane perpendicular to the axis of said shaft; a driven shaft coaxial with said driving shaft; a driven disk mounted on said driven shaft for movement therewith, having an annular bearing surface aligned with said bearing surface of said driving disk but normally spaced therefrom; a stationary annular brake plate surrounding said driven shaft adjacent said driven disk, said driven disk being disposed between said brake plate and said driving disk; a first bearing means supporting said driven shaft and axially immovable with respect to said driving shaft; a second bearing means supporting said driven shaft and axially immovable with respect thereto, said first and second bearing means being axially separated and mechanically independent of said driving shaft; resilient means extending between said first and second bearing means for urging said driven shaft axially away from said driving shaft to cause braking engagement of said driven disk with said brake plate; and magnetic means operable to move said driven shaft axially toward said driving shaft against the urging of said resilient means to cause driving engagement of said driven disk with said driving disk.

3. A magnetic clutch and brake of the class described which includes: a housing; an axially immovable driving shaft in said housing; a driving disk mounted on said shaft for rotation therewith, having a centrally located annular groove and an outer annular bearing surface; a driven shaft coaxial with said driving shaft and axially movable with respect thereto, normally spaced from said driving shaft; a driven disk mounted on said driven shaft for movement therewith, having an annular bearing surface aligned with said bearing surface of said driving disk but normally spaced therefrom; a stationary annular brake plate on said housing surrounding said driven shaft adjacent said driven disk, said driven disk being disposed between said brake plate and said driving disk; an inner bearing in said housing adjacent said brake plate supporting said driven shaft for rotation and axial movement relative to said housing, said bearing being axially immovable in said housing; an outer bearing in said housing axially spaced outwardly from said inner bearing for supporting the outer end of said driven shaft for rotation in said housing, said outer bearing being axially movable with respect to said housing and axially immovable with respect to said driven shaft, said bearings being both mechanically independent of said driving shaft; a compression spring extending between said inner and outer bearings urging them apart to thereby urge said driven shaft axially away from said driving shaft to cause braking engagement of said driven disk with said brake plate; and magnetic means operable to move said driven shaft axially toward said driving shaft against the urging of said spring to cause driving engagement of said driven disk with said driving disk.

4. A magnetic clutch and brake of the class described which includes: a housing; an axially immovable driving shaft in said housing; a driving disk mounted on said shaft for rotation therewith, having a centrally located annular groove and an outer annular bearing surface; a driven shaft coaxial with said driving shaft and axially movable with respect thereto, normally spaced from said driving shaft; a driven disk mounted on said driven shaft for movement therewith; a stationary annular brake plate on said housing surrounding said driven shaft adjacent said driven disk, said driven disk being disposed between said brake plate and said driving disk, said broke plate having an outer annular bearing surface; an annular bearing member of high friction material fixed on each face of said driven disk in alignment with said annular bearing surfaces of said driving disk and said brake plate; an inner bearing in said housing adjacent said brake plate supporting said driven shaft for rotation and axial movement relative to said housing, said inner bearing being axially immovable in said housing; an outer bearing in said housing axially spaced outwardly from said inner bearing for supporting the outer end of said driven shaft for rotation in said housing, said outer bearing being axially movable with respect to said housing and axially immovable with respect to said driven shaft, said bearing being both mechanically independent of said driving shaft; a compression spring extending between said inner and outer bearings urging them apart to thereby urge said driven shaft axially away from said driving shaft to cause braking engagement of said driven disk with said brake plate; and magnetic means operable to move said driven shaft axially toward said driving shaft against the urging of said spring to cause driving engagement of said driven disk with said driving disk.

VAINO A. HOOVER.

REFERENCES CITED

The following references are of record in the file of this patent:

UNITED STATES PATENTS

| Number | Name | Date |
| --- | --- | --- |
| 859,523 | Rowell | July 9, 1907 |
| 1,446,225 | Thompson | Feb. 20, 1923 |
| 1,925,956 | Easter | Sept. 5, 1933 |
| 2,267,114 | Lear et al. | Dec. 23, 1941 |
| 2,401,003 | Lear | May 28, 1946 |
| 2,421,949 | Lear | June 10, 1947 |
| 2,430,174 | Hoover | Nov. 4, 1947 |
| 2,438,223 | Lear | Mar. 23, 1948 |
| 2,448,879 | Gamble | Sept. 7, 1948 |
| 2,481,028 | Lear | Sept. 6, 1949 |
| 2,533,480 | Leininger | Dec. 12, 1950 |